United States Patent
Kajiwara et al.

(10) Patent No.: US 9,837,667 B2
(45) Date of Patent: Dec. 5, 2017

(54) CARBON-FIBER NONWOVEN CLOTH AND GAS DIFFUSION ELECTRODE FOR POLYMER ELECTROLYTE FUEL CELL USING SAME, POLYMER ELECTROLYTE FUEL CELL, METHOD FOR MANUFACTURING CARBON-FIBER NONWOVEN CLOTH, AND COMPOSITE SHEET

(71) Applicant: TORAY INDUSTRIES, INC., Tokyo (JP)

(72) Inventors: Kentaro Kajiwara, Otsu (JP); Satoru Shimoyama, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 108 days.

(21) Appl. No.: 14/439,954

(22) PCT Filed: Nov. 27, 2013

(86) PCT No.: PCT/JP2013/081835
§ 371 (c)(1),
(2) Date: Apr. 30, 2015

(87) PCT Pub. No.: WO2014/087887
PCT Pub. Date: Jun. 12, 2014

(65) Prior Publication Data
US 2015/0318558 A1    Nov. 5, 2015

(30) Foreign Application Priority Data

Dec. 5, 2012   (JP) ................................ 2012-266222

(51) Int. Cl.
*H01M 4/02*    (2006.01)
*H01M 4/86*    (2006.01)
(Continued)

(52) U.S. Cl.
CPC .......... *H01M 4/8626* (2013.01); *B32B 5/022* (2013.01); *B32B 5/06* (2013.01); *B32B 5/26* (2013.01);
(Continued)

(58) Field of Classification Search
CPC .... H01M 4/8626; H01M 4/8875; H01M 4/96; H01M 4/8807; H01M 4/8817;
(Continued)

(56) References Cited

U.S. PATENT DOCUMENTS 3,869,337 A    3/1975   Hoppe et al.
4,729,910 A    3/1988   Fukuda et al.
(Continued)

FOREIGN PATENT DOCUMENTS

EP    0333211 A2    9/1989
JP    60-242041 A   12/1985
(Continued)

OTHER PUBLICATIONS

Extended European Search Report for European Application No. 13860202.4, dated Jun. 15, 2016.
(Continued)

*Primary Examiner* — Jane Rhee
(74) *Attorney, Agent, or Firm* — Birch, Stewart, Kolasch & Birch, LLP

(57) ABSTRACT

Provided is a carbon-fiber nonwoven cloth with low resistance to gases or liquids passing through, and low resistance in the thickness direction to heat or electricity, which is particularly appropriate for a gas diffusion electrode of a polymer electrolyte fuel cell; the cloth having an air gap with a diameter of at least 20 μm, at least some of the carbon fibers being continuous from one surface to the other surface, and the apparent density being 0.2-1.0 g/cm³, or, having an air gap with a diameter of at least 20 μm and at
(Continued)

least some of the carbon fibers being mutually interlaced, and further, at least some of the carbon fibers being oriented toward the thickness direction and the apparent density being 0.2-1.0 g/cm$^3$.

11 Claims, 2 Drawing Sheets

(51) Int. Cl.
    *H01M 8/1018* (2016.01)
    *H01M 4/88* (2006.01)
    *B32B 5/26* (2006.01)
    *B32B 5/06* (2006.01)
    *B32B 5/02* (2006.01)
    *D04H 1/4242* (2012.01)
    *D01F 9/14* (2006.01)
    *H01M 4/96* (2006.01)

(52) U.S. Cl.
    CPC ............ *D01F 9/14* (2013.01); *D04H 1/4242* (2013.01); *H01M 4/8807* (2013.01); *H01M 4/8817* (2013.01); *H01M 4/8875* (2013.01); *H01M 4/96* (2013.01); *H01M 8/1018* (2013.01); *B32B 2262/106* (2013.01); *B32B 2307/72* (2013.01); *B32B 2457/18* (2013.01); *D10B 2101/08* (2013.01); *H01M 2008/1095* (2013.01); *H01M 2300/0082* (2013.01); *Y10T 156/1054* (2015.01)

(58) Field of Classification Search
    CPC ....... H01M 8/1018; H01M 2300/0082; H01M 2008/10958
    See application file for complete search history.

(56) References Cited

U.S. PATENT DOCUMENTS

2002/0187388 A1* 12/2002 Stumper ............. H01M 4/8605
    502/101
2011/0027667 A1* 2/2011 Sugimoto ............... C01B 3/065
    429/410
2012/0141911 A1 6/2012 Sumioka et al.

FOREIGN PATENT DOCUMENTS

| | | |
|---|---|---|
| JP | 62-154470 A | 7/1987 |
| JP | 2004-27468 A | 1/2004 |
| JP | 2005-317240 A | 11/2005 |
| JP | 2006-89875 A | 4/2006 |
| JP | 2007-269624 A | 10/2007 |
| JP | 2013-206704 A | 10/2013 |
| WO | WO 01/04980 A1 | 1/2001 |
| WO | WO 2011/065327 A1 | 6/2011 |

OTHER PUBLICATIONS

International Search Report issued in PCT/JP2013/081835, dated Jan. 14, 2014.

* cited by examiner

CARBON-FIBER NONWOVEN CLOTH AND GAS DIFFUSION ELECTRODE FOR POLYMER ELECTROLYTE FUEL CELL USING SAME, POLYMER ELECTROLYTE FUEL CELL, METHOD FOR MANUFACTURING CARBON-FIBER NONWOVEN CLOTH, AND COMPOSITE SHEET

TECHNICAL FIELD

The present invention relates to a carbon-fiber nonwoven cloth suitable for a gas diffusion electrode substrate for a polymer electrolyte fuel cell, a method for manufacturing the nonwoven cloth, and a composite sheet.

BACKGROUND ART

Woven cloths, knittings, and nonwoven cloths each made of carbon fibers have been widely researched since these products are suitable for electrode substrates, and have chemical stability and an appropriate compression stress to be each applied to a gas diffusion electrode for a polymer electrolyte fuel cell.

When used for such an article, a woven cloth, knitting or nonwoven cloth made of carbon fibers is required to have gas or liquid permeability and electroconductivity that are compatible with each other at a high level. For example, Patent Document 1 discloses, in view of gas or liquid permeability, a carbon fiber sheet which is obtained by using, as an intermediate reinforcing layer for the carbon fiber sheet, a thermoplastic resin net having a low actual carbon ratio after fired, and laminating cut fibers of carbon fibers onto each other at random in a two-dimensional plane, and which has many pores of 100 to 300 µm size in the sheet that are formed by the disappearance of the region of the net after fired.

A gas diffusion electrode for a polymer electrolyte fuel cell needs to be high in electroconductivity in the sheet thickness direction thereof. For example, Patent Document 2 discloses that carbon-fiber nonwoven cloths, in each of which the axes of fibers are directed to the thickness direction of the nonwoven cloth by a needle-punching method, are expected to be smaller in electric resistance value or higher in electroconductivity than carbon fiber sheets.

PRIOR ART DOCUMENTS

Patent Documents

Patent Document 1: JP 2008-44201 A
Patent Document 2: JP 2002-194650 A

SUMMARY OF THE INVENTION

Problems to be Solved by the Invention

The carbon fiber sheet disclosed in Patent Document 1 can make it easy that gas or liquid permeates the sheet by effect of the voids. However, when the voids are increased in number, the sheet does not easily gain high electroconductivity. Conversely, when the voids are decreased in number, a problem is caused that the sheet is decreased in gas or liquid permeability.

The carbon fiber sheet disclosed in Patent Document 2 makes use of a matter that the electroconductivity of a carbon fiber is better in the axis direction of the fiber than in a cross section direction thereof. The sheet is a sheet of directing its fiber axes to the thickness direction, thereby aiming to be improved in electroconductivity in the thickness direction of the sheet. However, a nonwoven cloth obtained by a needle-punching method is lower in apparent density than a nonwoven cloth obtained by fixing fibers of a web yielded by a papermaking method with a binder, and a woven cloth and a knitting. Thus, by compressing the needle-punched nonwoven cloth, this nonwoven cloth needs to be raised in apparent density to be improved in electroconductivity and mechanical properties. Consequently, at the compressing time, the fiber axes directed into the thickness direction by effect of the needle punching are bent or shifted so that the fiber axes may be directed into the plane direction. This matter results in a problem of cancelling, actually, almost all of the effect of directing the fiber axes into the thickness direction. Even when the fiber axes are not directed into the thickness direction, the following problem is caused by compressing the nonwoven cloth to give such an apparent density that the carbon fiber sheet can gain sufficient electroconductivity: all of the sizes of the pores are made small, so that the carbon fiber sheet is decreased in gas or liquid permeability.

An object of the present invention is provide a carbon-fiber nonwoven cloth small in passage-resistance when gas or liquid is passed therethrough, and further small in resistance against heat and electricity in the thickness direction of the nonwoven cloth, in particular, a carbon-fiber nonwoven cloth suitable for a gas diffusion electrode for a polymer electrolyte fuel cell.

Solutions to the Problems

The inventors have found out the following: a web of fibers and a fabric which is to be a spacer at the time of compressing are bonded to each other by needle punching and/or water jet punching while at least one part of the fibers are directed to the thickness direction of the web, and subsequently the resultant material is compressed and fired; this process makes it possible to compress the material into a given apparent density in the state that the respective axes of the fibers are directed to the thickness direction; furthermore, the material is fired to cause the fabric to disappear, thereby making appropriate pores; consequently, the nonwoven cloth can attain compatibility between gas or liquid permeability and electroconductivity in the thickness direction at a high level.

Accordingly, the carbon-fiber nonwoven cloth of the present invention for attaining the object is a carbon-fiber nonwoven cloth which includes carbon fibers and has two surfaces, and which has voids each having a diameter of 20 µm or more and has an apparent density of 0.2 to 1.0 g/cm$^3$, at least one part of the carbon fibers being continuous from one of the surfaces to the other surface.

Another aspect of the carbon-fiber nonwoven cloth of the present invention is a carbon-fiber nonwoven cloth which includes carbon fibers and which has voids each having a diameter of 20 µm or more and an apparent density of 0.2 to 1.0 g/cm$^3$, at least one part of the carbon fibers being entangled with each other, and at least one part of the carbon fibers being oriented in the thickness direction of the nonwoven cloth.

The method of the present invention for manufacturing a carbon-fiber nonwoven cloth is a method including: a bonding step of laminating a web made of fibers each having a carbonization yield of 30% or more, and a fiber fabric having a carbonization yield of 20% or less to each other, and bonding the web and the fiber fabric to each other by needle punching and/or water jet punching; a hot-pressing step of hot-pressing the web and the fiber fabric bonded to each other to produce a composite sheet; and a firing step of firing the composite sheet to be made into a carbon fiber form.

Furthermore, the composite sheet of the present invention is a composite sheet including fibers each having a carbonization yield of 30% or more, and a fiber fabric having a carbonization yield of 20% or less, wherein at least one part of the fibers having a carbonization yield of 30% or more penetrate the fiber fabric having a carbonization yield of 20% or less.

Effects of the Invention

The present invention makes it possible to provide a carbon-fiber nonwoven cloth small in passage-resistance when gas or liquid is passed therethrough, and further small in resistance against heat and electricity in the thickness direction of the nonwoven cloth, in particular, a carbon-fiber nonwoven cloth suitable for a gas diffusion electrode for a polymer electrolyte fuel cell.

EMBODIMENTS OF THE INVENTION

Figure 1:
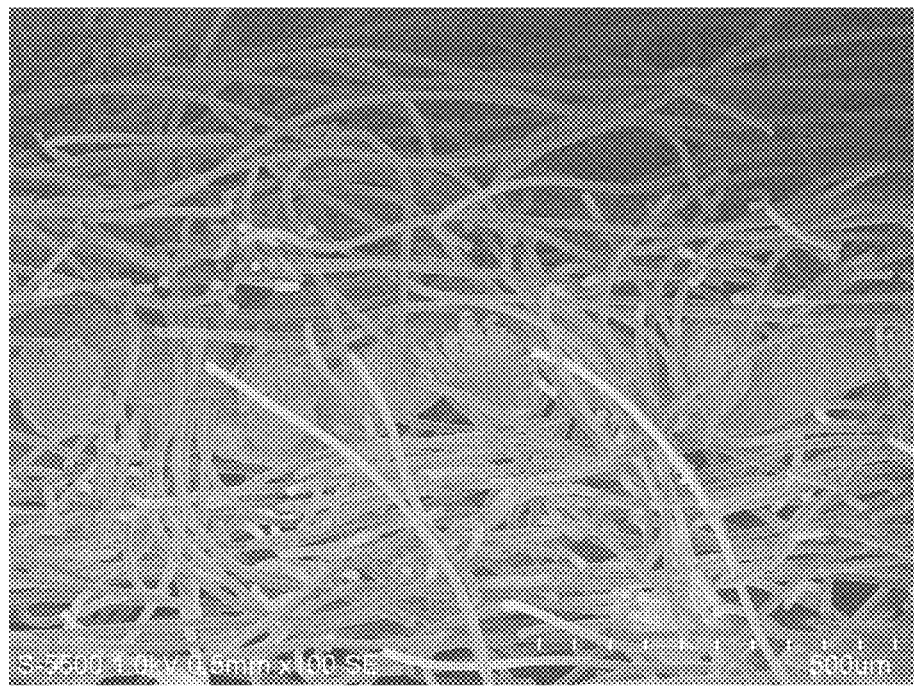
FIG. 1 is a scanning electron microscope photograph of a cross section of a composite sheet of the present invention.

The carbon-fiber nonwoven cloth of the present invention is a carbon-fiber nonwoven cloth which includes carbon fibers and has two surfaces, and which has voids each having a diameter of 20 μm or more and has an apparent density of 0.2 to 1.0 g/cm$^3$, at least one part of the carbon fibers being continuous from one of the surfaces to the other surface.

Another aspect of the carbon-fiber nonwoven cloth of the present invention is a carbon-fiber nonwoven cloth which includes carbon fibers and which has voids each having a diameter of 20 μm or more and an apparent density of 0.2 to 1.0 g/cm$^3$, at least one part of the carbon fibers being entangled with each other, and at least one part of the carbon fibers being oriented in the thickness direction of the nonwoven cloth.

The carbon-fiber nonwoven cloth of the present invention can be manufactured by a manufacturing method including: a bonding step of laminating a web made of fibers each having a carbonization yield of 30% or more, and a fiber fabric having a carbonization yield of 20% or less to each other, and bonding the web and the fiber fabric to each other by needle punching and/or water jet punching; a hot-pressing step of hot-pressing the web and the fiber fabric bonded to each other to produce a composite sheet; and a firing step of firing the composite sheet to be made into a carbon fiber form.

The fibers having a carbonization yield of 30% or more are carbonized to turn into carbon fibers, and contribute largely to the attainment of the following: a tensile stress resisting a process tensile force when the nonwoven cloth of the present invention is manufactured; a compression stress permitting the nonwoven cloth not to be broken when the nonwoven cloth is used as an electrode substrate; other mechanical properties; and high electroconductivity. In the present invention, it is sufficient for the carbonization yield of the fibers constituting the fiber web to be 30% or more. The carbonization yield is preferably 40% or more, more preferably 50% or more. If the carbonization yield is less than 30%, gaps between the fibers become large to make it difficult to express the mechanical properties and attain the high electroconductivity. It is more preferred from the viewpoint of productivity that the carbonization yield is higher. Thus, the upper limit thereof is not particularly limited, but the carbonization yield is generally 90% or less.

The carbonization yield in the present invention denotes a value obtained by measuring, in a thermogravimetry (TG) method, a change in the weight of a fiber or fabric when the temperature thereof is raised at 10° C./minute in a nitrogen atmosphere, and then dividing the difference between the weight at room temperature and that at 800° C. by the weight at room temperature.

Examples of the fibers having a carbonization yield of 30% or more include infusibilized polyacrylonitrile fiber, infusibilized pitch fiber, polyvinyl alcohol fiber, cellulose fiber, infusibilized lignin fiber, infusibilized polyacetylene fiber, infusibilized polyethylene fiber, and polybenzoxazole fiber.

The fiber length of the fibers having a carbonization yield of 30% or more is not particularly limited, and is preferably at least two times the thickness of a composite sheet obtained after the web and the fiber fabric are compressed, more preferably at least 10 times the thickness since the fibers need to penetrate the fiber fabric as will be described later. In general, the thickness of a gas diffusion electrode for a polymer electrolyte fuel cell is 500 μm or less, and thus the fiber length is preferably 5 mm or more, more preferably 10 mm or more. The upper limit of the fiber length of the fibers having a carbonization yield of 30% or more is not particularly limited. Thus, long fibers (continuous fibers), or short fibers having a length of 100 mm or less are usable.

The fiber diameter of the fibers having a carbonization yield of 30% or more is not particularly limited. However, if the fibers are thin, the fibers easily contact any member around the fibers so that the nonwoven cloth easily gains high electroconductivity, but it is difficult that the nonwoven cloth gains high gas or liquid permeability. An example of the appropriate fiber diameter is from 3 to 30 μm, more preferably from 5 to 20 μm. In the meantime, the fiber fabric having a carbonization yield of 20% or less is largely decreased in volume in the step of carbonizing the fibers having a carbonization yield of 30% or more. Thus, the resultant nonwoven cloth can gain high gas or liquid permeability in the plane direction and in the direction perpendicular thereto. The carbonization yield of the fibers is preferably 10% or less, more preferably 5% or less. If the carbonization yield is more than 20%, the nonwoven cloth cannot easily gain high gas or liquid permeability.

Examples of the fibers constituting the fiber fabric having a carbonization yield of 20% or less include polyethylene fiber, polypropylene fiber, polyethylene terephthalate fiber, polylactic acid fiber, and polyamide fiber. Even when the fiber fabric contains fibers having a carbonization yield more than 20% by mix spinning, fiber mixing, a composite yarn, mix weaving, mix knitting or some other, it is sufficient for the fiber fabric to have a carbonization yield of 20% or less.

The fiber length and the fiber diameter of the fibers constituting the fiber fabric having a carbonization yield of 20% or less are not particularly limited. Either short fibers or continuous fibers having a length of about 30 to 100 mm are usable. The fiber diameter of single fibers of the fiber fabric may be several micrometers. When monofilaments are used, the diameter thereof may be several hundreds of micrometers. It is preferred that when the composite sheet is carbonized, the fiber fabric is decreased in volume so that voids having a diameter of 20 µm or more are formed to raise the nonwoven cloth in gas or liquid permeability.

The form of the fiber fabric having a carbonization yield of 20% or less is not particularly limited. Examples thereof include woven cloth, knitting, nonwoven cloth, and netlike forms. The form can be appropriately selected in accordance with the degree of improvement of the nonwoven cloth in the gas or liquid permeability on the basis of a volume decrease of the fiber fabric when the fiber fabric is carbonized as far as the fiber fabric functions as a spacer at the time of the compression which will be detailed later.

When prioritizing, for example, electroconductivity in the thickness direction of the nonwoven cloth, this effect can be produced by making the mesh of the fabric large. When prioritizing gas or liquid permeability, this effect can be produced by making the mesh of the fabric small.

The woven cloth may have anyone of the following textures: single textures such as plain weave, satin weave and twill weave; double textures such as reversible figured; pile textures such as velvet; leno textures such as silk gauze; jacquard weaving; and figured brocade.

The knitting can be appropriately selected from weft knittings such as plain, rib, interlock and lace stitches, and warp knittings such as Denbigh, Atlas, and a cord.

The fiber fabric may be a nonwoven cloth, and may be a wet nonwoven cloth or a dry nonwoven cloth.

About each of the above-mentioned fiber fabrics, its fibers may be melted and bonded to each other at its intersection points since this case causes a thickness difference not to be easily generated between the intersection points and the other sites.

About the composite sheet of the present invention, at least one part of its fibers, which have a carbonization yield of 30% or more, need to penetrate the fiber fabric having a carbonization yield of 20% or less. The word "penetrate" denotes that some of the fibers are extended from one of the two surfaces of the fabric and cross the other surface of the fabric. As shown in FIG. 1, this matter can be verified, for example, by cutting the composite sheet by ion beams or with a razor and observing one of the resultant surfaces, or by evaluating a cross section of the composite sheet through a transmission image of the composite sheet that is obtained by the use of, for example, an X-ray. About the fibers having a carbonization yield of 30% or more, it is sufficient for at least one part thereof to penetrate the fiber fabric.

A case where the fiber fabric is a woven cloth is taken herein as an example. It is preferred that in 50% or more of its openings (spaces surrounded by its warps and wefts) overlapping with the web, the fibers having a carbonization yield of 30% or more penetrate the fiber fabric. It is more preferred that in 70% or more of the openings, the fibers penetrate the fiber fabric. By the matter that many ones of the fibers having a carbonization yield of 30% or more penetrate the fiber fabric as described herein, the composite sheet can gain high electroconductivity after carbonized.

The carbon-fiber nonwoven cloth of the present invention has pores having a diameter of 20 µm or more. The diameter of the pores is preferably 30 µm or more, more preferably 40 µm or more. If the pores are too small, the nonwoven cloth cannot easily gain high gas or liquid permeability. The upper limit thereof is not particularly limited, and is preferably smaller than the thickness of the carbon-fiber nonwoven cloth. If the voids are too large, the nonwoven cloth is liable to be unable to gain electroconductivity easily. Thus, the diameter of the pores is preferably less than 600 µm, more preferably 150 µm or less, even more preferably 100 µm or less.

The voids referred to in the present invention denote spaces in each of which no carbon fiber is present, in a cross section of the carbon-fiber nonwoven cloth, between one of the two surfaces of the cross section and the other surface. The size of each of the voids is observed in a direction perpendicular to the surfaces of the carbon-fiber nonwoven cloth. The diameter of the void denotes the diameter of a maximum inscribed circle to the void.

The thickness of the carbon-fiber nonwoven cloth of the present invention is not particularly limited. When the nonwoven cloth is used as a gas diffusion electrode for a polymer electrolyte fuel cell, the thickness is preferably from 50 to 300 µm, more preferably from 80 to 250 µm. If the nonwoven cloth is too thin, the material thereof does not endure a process tensile force in the manufacture. If the nonwoven cloth is too thick, the carbon-fiber nonwoven cloth does not easily transmit gas or liquid, and is further lowered in electroconductivity. The thickness of the carbon-fiber nonwoven cloth is a value obtained according to JIS L 1913 6. 1 (thickness (A-method)) by collecting 10 test specimens of 5 cm×5 cm size therefrom, measuring the respective thicknesses of the test specimens under an applied pressure of 0.5 kPa after 10 seconds of the application with an automatic compression elasticity-thickness tester (model: CEH-400, manufactured by Daiei Kagaku Seiki Mfg. Co., Ltd.), and then averaging the thicknesses.

In an embodiment of the carbon-fiber nonwoven cloth of the present invention, at least one part of the carbon fibers need to be continuous from one of the two surfaces of the nonwoven cloth to the other surface. Any carbon fiber is better in electroconductivity in the fiber axis direction than in a cross section direction of the fiber; and continuous fibers are better in electric conduction efficiency than fibers contacting each other. Accordingly, the carbon fibers which are continuous from the one surface to the other surface gain higher electroconductivity than discontinuous carbon fibers.

Figure 2:
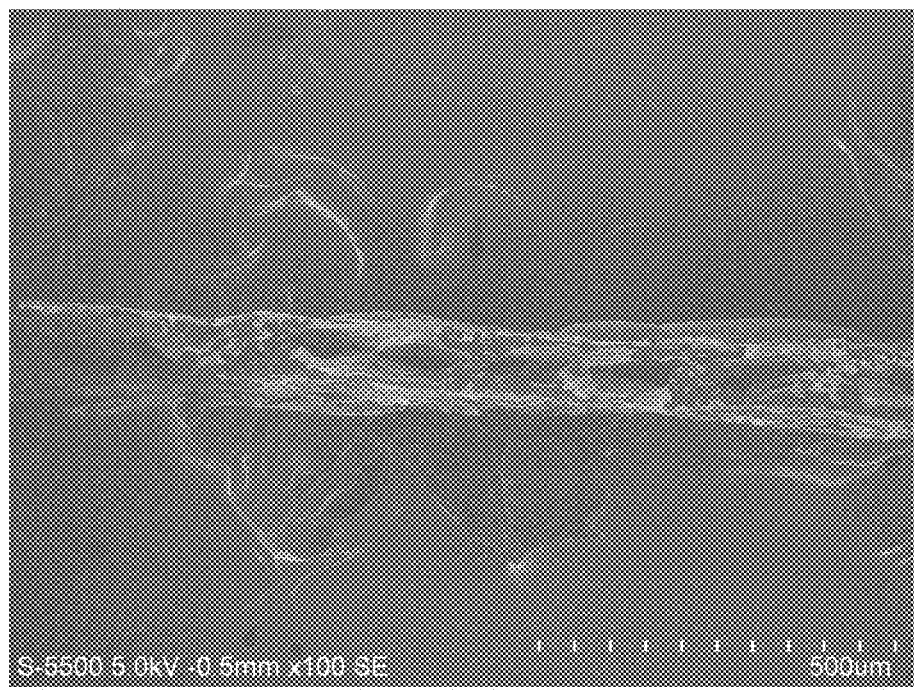
FIG. 2 is a scanning electron microscope photograph of a cross section of a carbon-fiber nonwoven cloth of the present invention.
Figure 3:
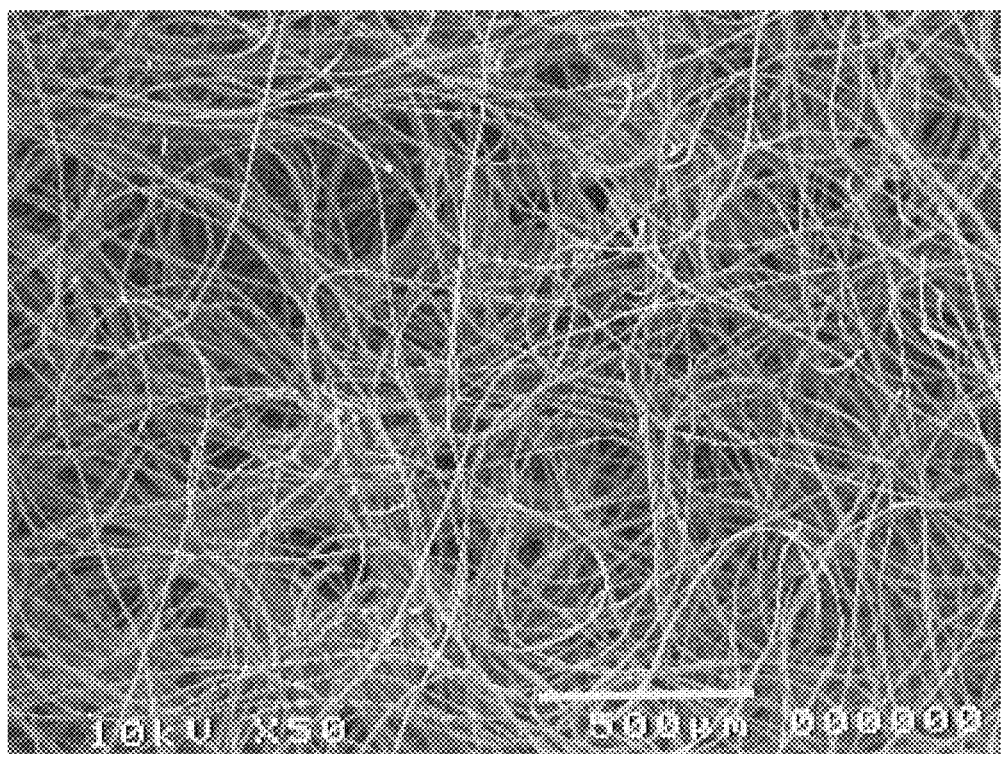
FIG. 3 is a scanning electron microscope photograph of a front surface of a carbon-fiber nonwoven cloth of the present invention.

The wording "be continuous from one of the surfaces of the nonwoven cloth to the other surface" denotes that it cannot be recognized that the fibers are cut between the one surface and the other surface. As shown in FIG. 2, this matter can be verified, for example, by cutting the nonwoven cloth by ion beams or with a razor and observing one of the resultant surfaces, or by evaluating fibers along a cross section direction of the nonwoven cloth through a transmission image of the nonwoven cloth that is obtained by the use of, for example, an X-ray. About the carbon fibers, it is sufficient for at least one part thereof to be continuous from the one surface of the nonwoven cloth to the other surface. The carbon-fiber nonwoven cloth gains high electroconductivity more easily as the presence proportion of continuous fibers is higher. Thus, it is preferred that plural fibers are continuous in a range of 1 mm$^2$ (1 mm×1 mm) when the carbon-fiber nonwoven cloth is viewed from the front surface thereof. It is more preferred that plural fibers are continuous in a range of 0.1 mm$^2$ (0.3 mm×0.3 mm).

In an embodiment of the carbon-fiber nonwoven cloth of the present invention, at least one part of the carbon fibers need to be entangled with each other, and at least one part of the carbon fibers need to be oriented in the thickness direction of the nonwoven cloth. Any carbon fiber is better in electroconductivity in the fiber axis direction than in a cross section direction of the fiber; and when carbon fibers are entangled with each other and are further oriented in the thickness direction, the carbon fibers are easily made electroconductive in the thickness direction so that the carbon-fiber nonwoven cloth can gain high electroconductivity.

Whether or not carbon fibers are entangled with each other and are further oriented in the thickness direction can be checked, as described above and illustrated in FIG. 2, for example, by cutting the nonwoven cloth by ion beams or with a razor and observing one of the resultant surfaces, or by evaluating fibers along a cross section direction of the nonwoven cloth through a transmission image of the nonwoven cloth that is obtained by the use of, for example, an X-ray. Mere crossing between fibers and mere contact between fibers do not denote the entanglement between fibers.

The weight per unit area of the carbon-fiber nonwoven cloth of the present invention is not particularly limited, and is preferably from 30 to 120 g/m$^2$, more preferably from 60 to 90 g/m$^2$. If the weight per unit area is low, the material of the nonwoven cloth does not endure a process tensile force in the manufacture, and further the nonwoven cloth is poor in handleability. If the weight per unit area is high, the nonwoven cloth does not transmit gas or liquid easily when used as an electrode substrate. The weight per unit area is a value obtained by dividing the weight of the carbon-fiber nonwoven cloth by the area thereof.

The apparent density of the carbon-fiber nonwoven cloth of the present invention is from 0.2 to 1.0 g/cm$^3$, preferably from 0.3 to 0.9 g/cm$^3$, more preferably from 0.4 to 0.8 g/cm$^3$. If the apparent density is less than 0.2 g/cm$^3$, the nonwoven cloth does not easily gain sufficient electroconductivity when used as an electrode substrate, and further the structure thereof is easily broken by a pressure given to the electrode substrate. If the apparent density is more than 1.0 g/cm$^3$, the nonwoven cloth does not easily gain sufficient gas or liquid permeability when used as an electrode substrate.

The apparent density of the carbon-fiber nonwoven cloth is a value obtained by dividing the weight per unit area by the thickness.

It is preferred that a binder is bonded to the carbon-fiber nonwoven cloth of the present invention to improve the nonwoven cloth in shape retainability, handleability, and others. In order to improve the nonwoven cloth in electroconductivity, for example, carbon black may be further added to this binder. The weight per unit are of this carbon-fiber nonwoven cloth in this case is a value obtained by dividing the total sum of the carbon fiber, the binder, carbon black and other additives by the area. The apparent density thereof is a value obtained by dividing the weight per unit area by the thickness.

The carbon-fiber nonwoven cloth of the present invention is suitable for a gas diffusion electrode for a polymer electrolyte fuel cell from the viewpoint of a balance between the electroconductivity and the gas or liquid permeability. The nonwoven cloth is usable as it is as a gas diffusion electrode for a polymer electrolyte fuel cell. It is preferred to apply thereto one selected from water repellent treatment, the formation of a microporous layer, catalyst painting and others, or a combination of two or more selected therefrom since better advantageous effects can be expected.

The following will describe a method of the present invention for manufacturing a carbon-fiber nonwoven cloth. The method of the present invention for manufacturing a carbon-fiber nonwoven cloth has a bonding step of bonding a web including fibers each having a carbonization yield of 30% or more, and a fiber fabric having a carbonization yield of 20% or less to each other by needle punching and/or water jet punching; a hot-pressing step of hot-pressing the web and the fiber fabric bonded to each other to produce a composite sheet; and a firing step of firing the produced composite sheet to be made into a carbon fiber form.

<Bonding Step>

The web, which includes fibers each having a carbonization yield of 30% or more and supplied to the needle punching and/or the water jet punching, is selectable, alone or in the form of any combination, from a web obtained by subjecting carded fibers to parallel-laying or cross-laying, a dry web yielded by air-laying, discontinuous fiber webs such as a wet web made by a papermaking method, and continuous fiber webs each made by spunbonding, melt blowing, electrospinning, or flash spinning. Of these webs, a discontinuous fiber web is preferred since the web easily gives a relatively even sheet even when the weight per unit area thereof is less than 100 g/m$^2$. A dry web is preferred since the web can be expected to be lower in bending elasticity, more easily wound, larger in fiber length and higher in electroconductivity than any wet web.

The web made of fibers each having a carbonization yield of 30% or more may contain fibers, particles and/or an adhering matter that has/have a carbonization yield less than 30%; fibers, particles and/or an adhering matter that has/have a carbonization yield of 30% or more; and/or a carbonized matter from carbon fibers, carbon particles and/or others as far as the effects of the present invention are not impaired.

Such a web is laminated onto one surface or each surface of the fiber fabric having a carbonization yield of 20% or less, and then the resultant is subjected to needle punching and/or water jet punching. In this way, the fibers are entangled with each other, and the orientation of the fibers is advanced into the thickness direction in the state that the fibers penetrate the openings in the fiber fabric having a carbonization yield of 20% or less. Alternatively, in this way, the fibers are made continuous from the one surface to the other surface.

In the case of the needle punching, the entanglement between the fibers, the orientation of the fibers in the thickness direction, or the continuation of the fibers from the one surface to the other surface can be adjusted in accordance with the shape of the needles, the number of the needles to be punched, and the depth of the needles. When the number of their barbs, the volume, or the needle density is increased, the number of the fibers shifted into the thickness direction is increased. In the case of the hydroentanglement, the fibers are easily shifted in the thickness direction when the nozzle diameter or the water pressure is increased. The water pressure used in the hydroentanglement is varied in accordance with the nozzle diameter or nozzle pitch, the distance between the nozzle and the web, the transporting speed, the fiber species, the fiber length, the fiber diameter, the web weight per unit are, and/or others. The pressure is, for example, from 5 to 20 MPa, preferably from 10 to 20 MPa. As the web transporting speed is low, the effect of shifting the fibers into the thickness direction becomes larger. Only the needle punching is preferably performed since the punching makes any drying step unnecessary, and can be therefore expected to exhibit high productivity.

In order for the fibers constituting the fiber fabric to avoid being caught or hooked onto the barbs of the needles in the needle punching step, the fibers having a carbonization yield of 20% or less are each preferably a monofilament having a relatively large filament diameter, or a multifilament having a twist number of 1000 to 4000 T/M. The twist number is measurable by a method prescribed in JIS L1096 (2005) 8. 8. 2 that is a general fabric test method.

The web made of fibers each having a carbonization yield of 30% or more may be laminated onto one surface or each surface of the fiber fabric having a carbonization yield of 20% or less. Such a single web or such plural webs may be laminated thereonto. The lamination onto one surface of the fabric is preferred since the process is simple and can be easily handled or made low in costs.

The voids having a diameter of 20 μm or more, which the carbon-fiber nonwoven cloth of the present invention has, are formed by decreasing the volume of the fiber fabric having a carbonization yield of 20% or less when the laminate is carbonized. The diameter of the voids is controllable in accordance with the diameter of the fibers constituting the fiber fabric having a carbonization yield of 20% or less. As the fibers constituting the fiber fabric having a carbonization yield of 20% or less are larger in diameter, the voids are larger in diameter so that the carbon-fiber nonwoven cloth more easily transmits gas or liquid, but the number of the fibers present in the void portions becomes smaller and further it becomes more difficult to make the nonwoven cloth thin. It therefore becomes difficult that the nonwoven cloth gains high electroconductivity.

This process yields a composite sheet of the present invention that is composed of the web made of the fibers having a carbonization yield of 30% or more, and the fiber fabric having a carbonization yield of 20% or less. In this sheet, at least one part of the fibers having a carbonization yield of 30% or more penetrate the fiber fabric having a carbonization yield of 20% or less.

<Hot-Pressing Step>

Next, a continuous press machine using a calender roller, or a press machine using a flat plate is used to perform a hot-pressing step of subjecting the composite sheet to compressing treatment (hot-pressing). Usually, the apparent density of the composite sheet yielded by the needle punching and/or the water jet punching is from about 0.02 to 0.20 g/cm$^3$. When this sheet is carbonized as it is, the resultant does not easily gain electroconductivity necessary for an electrode substrate. In this step, the compressing treatment is preferably conducted to set the apparent density of the composite sheet into the range of 0.3 to 1.3 g/cm$^3$. In this case, depending on the raw material composition and the spinning conditions, appropriate conditions for the compressing treatment are varied. However, while the situation of the treatment is checked, the temperature, the pressure, the and compression rate are controllable. The compression is generally performed preferably at 100° C. or higher, more preferably at 130° C. or higher to produce a compression effect. If the temperature is too high, the fibers are easily melted or deteriorated. The temperature is preferably 400° C. or lower, more preferably 250° C. or lower. It is particularly preferred to conduct the compressing treatment at a temperature which does not permit the fiber fabric having a carbonization yield of 20% or less to be melted since this treatment does not cause a large change of the fiber axis direction of the fibers having a carbonization yield of 30% or more that are present in the openings of the fiber fabric having a carbonization yield of 20% or less.

<Firing Step>

Subsequently, a firing step is performed in which the thus produced composite sheet is fired to be made into a carbon fiber form. The method for the firing is not particularly limited as far as the method is an ordinarily used method. The method is preferably based on a heating treatment at 800° C. or higher in an inert atmosphere.

It is preferred to adjust appropriately conditions for the hot-pressing treatment for producing the composite sheet, and ones for the firing to produce a carbon-fiber nonwoven cloth having an apparent density of 0.2 to 1.0 g/cm$^2$ after the sheet is made into a carbon fiber form.

When the carbon-fiber nonwoven cloth is used as an electrode substrate, it is preferred to subject the nonwoven cloth to graphitizing treatment at a temperature of 2000° C. or higher.

In the present invention, a binder may be supplied into the composite sheet before the carbonization, or the carbon-fiber nonwoven cloth after the carbonization. It is preferred to supply the binder as a precursor thereof. The binder is not particularly limited as far as the binder is fired to be carbonized. Examples thereof include phenolic resin, epoxy resin, and acrylic resin. For improving electroconductivity, the binder may be supplied, in the state of a binder precursor solution in which, for example, carbon black is dispersed, by immersing the composite sheet or nonwoven cloth into the solution, or spraying the solution. When carbonized, the composite sheet is shrunken to be changed in form so as to easily lose surface flatness; thus, it is preferred from the viewpoint of the stability of the form and the surface flatness to carbonize the composite sheet to be turned to a carbon-fiber nonwoven cloth that is not shrunken any more, supply the binder precursor thereto, and again carbonize the material. In a case where the fibers having a carbonization yield of 30% or more are melted to be bonded to each other, the composite sheet is similarly shrunken to be changed in form when carbonized. Consequently, the resultant nonwoven cloth easily loses surface smoothness. Thus, this case would not be preferable.

About the binder precursor to be supplied in the present invention, the carbonization yield is preferably 30% or more, more preferably 40% or more from the viewpoint of the productivity.

When the carbon-fiber nonwoven cloth of the present invention is fired, the fiber fabric having a carbonization yield of 20% or less is largely decreased in quantity so that pores continuous in the plane direction and voids having a diameter of 20 μm or more are formed. When the carbon-fiber nonwoven cloth of the present invention is pressed to make the apparent density thereof large, the fiber fabric having a carbonization yield of 20% or less functions as a spacer not to compress the fibers which have a carbonization yield of 30% or more and are present in the openings in the fiber fabric to penetrate the fabric. Thus, a carbon-fiber nonwoven cloth is obtained which has a structure in which fibers of an inner layer are oriented in the thickness direction even after the firing. Accordingly, in the case of using the carbon-fiber nonwoven cloth of the present invention as a gas diffusion electrode for a fuel cell, the nonwoven cloth easily transmits gas or liquid since the apparent density of the inner layer is small. Additionally, the nonwoven cloth gains relatively high electroconductivity since the fiber axes are directed into the thickness direction. Furthermore, use is made of the pores continuous in the plane direction of the inner layer as a channel for gas or liquid, thereby yielding a structure advantageous in terms of costs that does not require a separator.

EXAMPLES

In Examples, physical property values were measured by methods described below.

1. Void Diameter

Ion beams were used to cut a test specimen in a direction perpendicular to a surface thereof. One of the cross sections was observed in its range over 5 mm in the surface direction. Out of voids in the observed range, a void the maximum inscribed circle of which had a maximum diameter was measured. The diameter of the maximum inscribed circle was defined as the diameter of the voids.

2. Apparent Density

According to JIS L 1913 6. 1 (thickness (A-method)), 10 test specimens of 5 cm×5 cm size were collected. An automatic compression elasticity-thickness tester (model: CEH-400, manufactured by Daiei Kagaku Seiki Mfg. Co., Ltd.) was used to measure the respective thicknesses of the test specimens under an applied pressure of 0.5 kPa after 10 seconds of the application. The average of the measured values was calculated out as the thickness, and then from this thickness, the size (5 cm×5 cm), and the weight, the apparent density was calculated by rounding off the calculated value to two decimal places.

3. Gas Permeation Resistance

A test specimen (diameter: 50 mm) was sandwiched between discs having an inside diameter of 12 mm and an outside diameter of 100 mm, and then a pressure of 1 MPa was applied to the test specimen. Air was supplied at a flow rate of 1.0 L/minute into a hollow portion of one of the discs while a hollow portion of the other disc was opened to the atmospheric air. The supply-side pressure (difference between the supply-side and opened-side pressures) at this time was defined as the gas permeation resistance.

4. Electric Resistance

A test specimen (20 mm×20 mm) was sandwiched between gold-plated copper plates 100 mm×100 mm in size, and then a pressure of 1 MPa was applied to the test specimen. A current of 1.0 A was caused to flow between the copper plates. A difference between the electric resistance at this time and that measured when the test specimen was not sandwiched therebetween was defined as the electric resistance.

Production Example 1 (Dry Web)

A copolymer composed of 99.4% by mole of acrylonitrile and 0.6% by mole of methacrylic acid was used to yield polyacrylonitrile (PAN) fiber bundles each made of 12,000 filaments and having a fineness of 1 dtex by a dry and wet spinning method. The resultant PAN fiber bundles were heated at a stretch ratio of 1.05 in air having a temperature of 240 to 280° C. to yield PAN flame-resistant yarns (density: 1.38 g/cm$^3$).

Next, a push-in type crimper was used to convert the PAN flame-resistant yarns to crimped yarns. The number of crimps in the resultant crimped yarns, which were in a zigzag form, was 7.1/25-mm, and the crimp percentage was 12.7%. The flame-resistant yarns were cut into a number-average fiber length of 76 mm, and then a card and a cross lapper were used to render the resultant a dry web having a weight per unit area of 60 g/m$^2$.

Production Example 2 (Woven Cloth)

A PET (polyethylene terephthalate) component having an intrinsic viscosity of 0.66 was spun and stretched to yield fibers having a fineness of 56 dtex and 48 filaments. These fibers were twisted at 2400 T/m into an S twist form, and then set by steam at 75° C. In the same way, the fibers were twisted at 2400 T/m into a Z twist form, and then set by steam at 75° C. to yield yarns. The S-twisted yarns and the Z-twisted yarns were alternately arranged as warps, and the S-twisted yarns were used as wefts to produce a woven cloth (fiber fabric) having a weave texture of plain weave, a weave density of 93×64 yarns/2.54-cm, and a weight per unit area of 60 g/m$^2$.

Production Example 3 (Wet Web)

A copolymer composed of 99.4% by mole of acrylonitrile and 0.6% by mole of methacrylic acid was used to yield polyacrylonitrile (PAN) fiber bundles each made of 12,000 filaments and having a fineness of 1 dtex by a dry and wet spinning method. The resultant PAN fiber bundles were heated at a stretch ratio of 1.05 in air having a temperature of 240 to 280° C. to yield PAN flame-resistant yarns (density: 1.38 g/cm$^3$), and then the yarns were fired at 1500° C. in a nitrogen atmosphere (first carbonization) to produce PAN carbon fibers (density: 1.77 g/cm$^3$).

Next, the PAN carbon fibers were cut into pieces of 5 mm length, and 70 parts by weight of the cut fibers were mixed with 30 parts by weight of PVA fibers of 5 mm fiber-length as a binder into a uniform state, and then the resultant was subjected to papermaking treatment to produce a wet web having a weight per unit area of 20 g/m$^2$.

Example 1

The dry web of Production Example 1 was laminated onto one surface of the woven cloth of Production Example 2, and the resultant was needle-punched (NP) from the dry web side of the laminate to yield a composite sheet, having an apparent density of 0.10 g/cm$^3$, in which the fibers constituting the dry web penetrated the woven cloth from one of the two surfaces of the nonwoven cloth to the other surface (bonding step).

The resultant composite sheet was compressed with a press machine heated to 200° C. to set the apparent density thereof to 0.50 g/cm$^3$ (hot-pressing step).

Next, the temperature of the composite sheet was raised to a temperature of 1500° C. in a nitrogen atmosphere to fire the composite sheet (first carbonization). In this way, a PAN carbon-fiber nonwoven cloth was yielded (firing step).

A phenolic resin and graphite were supplied to this PAN carbon-fiber nonwoven cloth to have quantities of 40 g/m$^2$ and 15 g/m$^2$, respectively.

The nonwoven cloth was again carbonized (second carbonization) in a N$_2$ atmosphere in an electric furnace of 1500° C. to yield a carbon-fiber nonwoven cloth. The resultant carbon-fiber nonwoven cloth was observed with an X-ray CT. As a result, it was verified that some of the fibers that had constituted the dry web were continuous from one of the two surface of the nonwoven cloth to the other surface. It was also verified that the fibers were entangled with each other and further the fibers were oriented in the thickness direction. Evaluation results of the resultant carbon-fiber nonwoven cloth are as shown in Table 1. The nonwoven cloth was high in gas permeability and small in electric resistance.

Example 2

The dry web of Production Example 1 was put onto a 30-mesh polyamide 6 monofilament sheet (mesh sheet), and this laminate was water-jet-punched (WJP) from the dry web side thereof to yield a composite sheet, having an apparent density of 0.15 g/cm$^3$, in which the fibers that had constituted the dry web penetrated the sheet from one of the two surfaces of the sheet to the other surface.

This composite sheet was treated in the same way as in Example 1 to yield a carbon-fiber nonwoven cloth. The resultant carbon-fiber nonwoven cloth was observed with an X-ray CT. As a result, it was verified that some of the fibers constituting the dry web were continuous from one of the two surface of the nonwoven cloth to the other surface. It was also verified that the fibers were entangled with each other and further the fibers were oriented in the thickness direction. Evaluation results of the resultant carbon-fiber nonwoven cloth are as shown in Table 1. The nonwoven cloth was high in gas permeability and small in electric resistance.

Example 3

A carbon-fiber nonwoven cloth was yielded in the same way as in Example 1 except that a dry web, the weight per unit area of which was ½ of that of the web of Production Example 1, was laminated onto each side of the woven cloth of Production Example 2. The laminate was needle-punched alternately from one of the two surfaces thereof and from the other surface. The resultant carbon-fiber nonwoven cloth was observed with an X-ray CT. As a result, it was verified that some of the fibers that had constituted the dry web were continuous from one of the two surface of the nonwoven cloth to the other surface. It was also verified that the fibers were entangled with each other and further the fibers were oriented in the thickness direction. Evaluation results of the resultant carbon-fiber nonwoven cloth are as shown in Table 1. The nonwoven cloth was high in gas permeability and small in electric resistance.

Example 4

A carbon-fiber nonwoven cloth was yielded in the same way as in Example 1 except that after the supply of the phenolic resin and the graphite before the carbonization, the material was fired in a N$_2$ atmosphere in an electric furnace of 1500° C. to make the PAN flame-resistant yarns into a carbon fiber form, decomposing and removing the woven cloth, and carbonizing the phenolic resin simultaneously. The resultant carbon-fiber nonwoven cloth was observed with an X-ray CT. As a result, it was verified that some of the fibers that had constituted the dry web were continuous from one of the two surface of the nonwoven cloth to the other surface. It was also verified that the fibers were entangled with each other and further the fibers were oriented in the thickness direction. Evaluation results of the resultant carbon-fiber nonwoven cloth are as shown in Table 1, and the nonwoven cloth was high in gas permeability and small in electric resistance.

Comparative Example 1

A carbon-fiber nonwoven cloth was yielded in the same way as in Example 1 except that the woven cloth of Production Example 2 was not laminated and the needle punching was performed alternately from one of the two surfaces of the material and from the other surface. Evaluation results of the resultant carbon-fiber nonwoven cloth are as shown in Table 1. No voids having a diameter of 20 μm or more were formed so that this example was poorer in gas permeability than Example 1.

Comparative Example 2

A carbon-fiber nonwoven cloth was yielded in the same way as in Example 1 except that the needle punching was not performed so that the fibers constituting the dry web did not penetrate the woven cloth from one of the two surfaces thereof to the other surface. The resultant carbon-fiber nonwoven cloth was observed with an X-ray CT. As a result, the fibers that had constituted the dry web were not continuous from one of the two surface of the nonwoven cloth to the other surface. Moreover, the fibers were not entangled with each other. Furthermore, the fibers were not oriented in the thickness direction. Evaluation results of the resultant carbon-fiber nonwoven cloth are as shown in Table 1. This example was larger in electric resistance than Example 1.

Comparative Example 3

The wet carbon fiber web of Production Example 3 was laminated onto each side of a 30-mesh polyamide 6 monofilament sheet (mesh sheet), and then the laminate was compressed with a press machine heated to 200° C. (hot-pressing step).

Next, the temperature of the material was raised to a temperature of 1500° C. in a nitrogen atmosphere to fire the material (second carbonization). In this way, a PAN carbon-fiber nonwoven cloth was yielded (firing step). The resultant carbon-fiber nonwoven cloth was observed with an X-ray CT. As a result, the fibers that had constituted the dry web were not continuous from one of the two surface of the nonwoven cloth to the other surface. Moreover, the fibers were not entangled with each other, and further the fibers were not oriented in the thickness direction. Evaluation results of the resultant carbon-fiber nonwoven cloth are as shown in Table 1. This example was larger in electric resistance than Example 2.

Comparative Example 4

A carbon-fiber nonwoven cloth was yielded in the same way as in Example 1 except that no compressing treatment was conducted before the first firing. The resultant carbon-fiber nonwoven cloth was low in apparent density. Evaluation results thereof are as shown in Table 1. This example was larger in electric resistance than Example 1. At the pressure of 1 MPa, which was given for the evaluation, the carbon-fiber nonwoven cloth was broken, so that a large amount of powder of the carbonized matter remained on the measuring stage.

TABLE 1

|  | Web laminated | Fiber fabric | Entangling method | Void diameter μm | Apparent density g/cm³ | Gas permeation resistance Pa | Electric resistance mΩ |
|---|---|---|---|---|---|---|---|
| Example 1 | One surface | Woven cloth | NP | 70 | 0.42 | 30 | 2 |
| Example 2 | One surface | Mesh sheet | WJP | 100 | 0.42 | 25 | 2.5 |
| Example 3 | Both surfaces | Woven cloth | NP | 70 | 0.42 | 30 | 2 |
| Example 4 | One surface | Woven cloth | NP | 70 | 0.42 | 30 | 2 |
| Comparative Example 1 | — | — | NP | 15 | 0.42 | 40 | 2 |
| Comparative Example 2 | One surface | Woven cloth | — | 70 | 0.42 | 30 | 3 |
| Comparative Example 3 | Both surfaces | Mesh sheet | — | 100 | 0.42 | 25 | 3 |
| Comparative Example 4 | One surface | Woven cloth | NP | 70 | 0.12 | 20 | 4 |

The invention claimed is:

1. A carbon-fiber nonwoven cloth, which has upper and lower surfaces extending in a planar direction that is perpendicular to the nonwoven cloth thickness direction, and which comprises carbon fibers and voids, wherein the voids extend continuously in the planar direction and each have a diameter of 20 μm or more, the nonwoven cloth has an apparent density of 0.2 to 1.0 g/cm³, and at least a portion of the carbon fibers extends continuously in the thickness direction between the upper and lower surfaces.

2. A carbon-fiber nonwoven cloth, which has upper and lower surfaces extending in a planar direction that is perpendicular to the cloth thickness direction, and which comprises carbon fibers and voids, wherein the voids extend continuously in the planar direction and each have a diameter of 20 μm or more, the nonwoven cloth has an apparent density of 0.2 to 1.0 g/cm³, at least a portion of the carbon fibers are entangled with each other, and at least a portion of the carbon fibers are oriented in the thickness direction of the nonwoven cloth.

3. The carbon-fiber nonwoven cloth according to claim 1, wherein the voids act as gas channels.

4. A polymer electrolyte fuel cell which includes the carbon-fiber nonwoven cloth recited in claim 1.

5. A method for manufacturing a carbon-fiber nonwoven cloth, comprising:
laminating a web comprising fibers each having a carbonization yield of 30% or more, and a fiber fabric having a carbonization yield of 20% or less to each other,
bonding the web and the fiber fabric to each other by needle punching and/or water jet punching;
hot-pressing the web and the fiber fabric bonded to each other to produce a composite sheet; and
firing the composite sheet to form the carbon fiber nonwoven cloth, which has upper and lower surfaces extending in a planar direction that is perpendicular to the nonwoven cloth thickness direction, and which comprises carbon fibers voids, wherein the voids extend continuously in the planar direction and each have a diameter of 20 pm or more, the nonwoven cloth and has an apparent density of 0.2 to 1.0 g/cm3, and at least a portion of the carbon fibers extends continuously in the thickness direction between the upper and lower surfaces.

6. The method for manufacturing a carbon-fiber nonwoven cloth according to claim 5, wherein the web is laminated onto one surface of the fiber fabric in the bonding step.

7. The method for manufacturing a carbon-fiber nonwoven cloth according to claim 5, wherein in the firing step, the composite sheet, which has been made into the carbon fiber form by the once-performed firing, is subjected to a carbonizing treatment of bonding a binder precursor having a carbonization yield of 30% or more to the composite sheet, and firing the binder-precursor-bonded composite sheet again.

8. The carbon-fiber nonwoven cloth according to claim 2, wherein the voids act as gas channels.

9. The carbon-fiber nonwoven cloth according to claim 2, which is usable as a gas diffusion electrode for a polymer electrolyte fuel cell.

10. A polymer electrolyte fuel cell which includes the carbon-fiber nonwoven cloth recited in claim 2.

11. The method for manufacturing a carbon-fiber nonwoven cloth according to claim 6, wherein in the firing step, the composite sheet, which has been made into the carbon fiber form by the once-performed firing, is subjected to a carbonizing treatment of bonding a binder precursor having a carbonization yield of 30% or more to the composite sheet, and firing the binder-precursor-bonded composite sheet again.

* * * * *